No. 625,704. Patented May 23, 1899.
C. G. SCHMIDT.
ARRANGING AND HANDLING SAUSAGE CASINGS.
(Application filed May 28, 1898.)
(No Model.) 2 Sheets—Sheet 1.
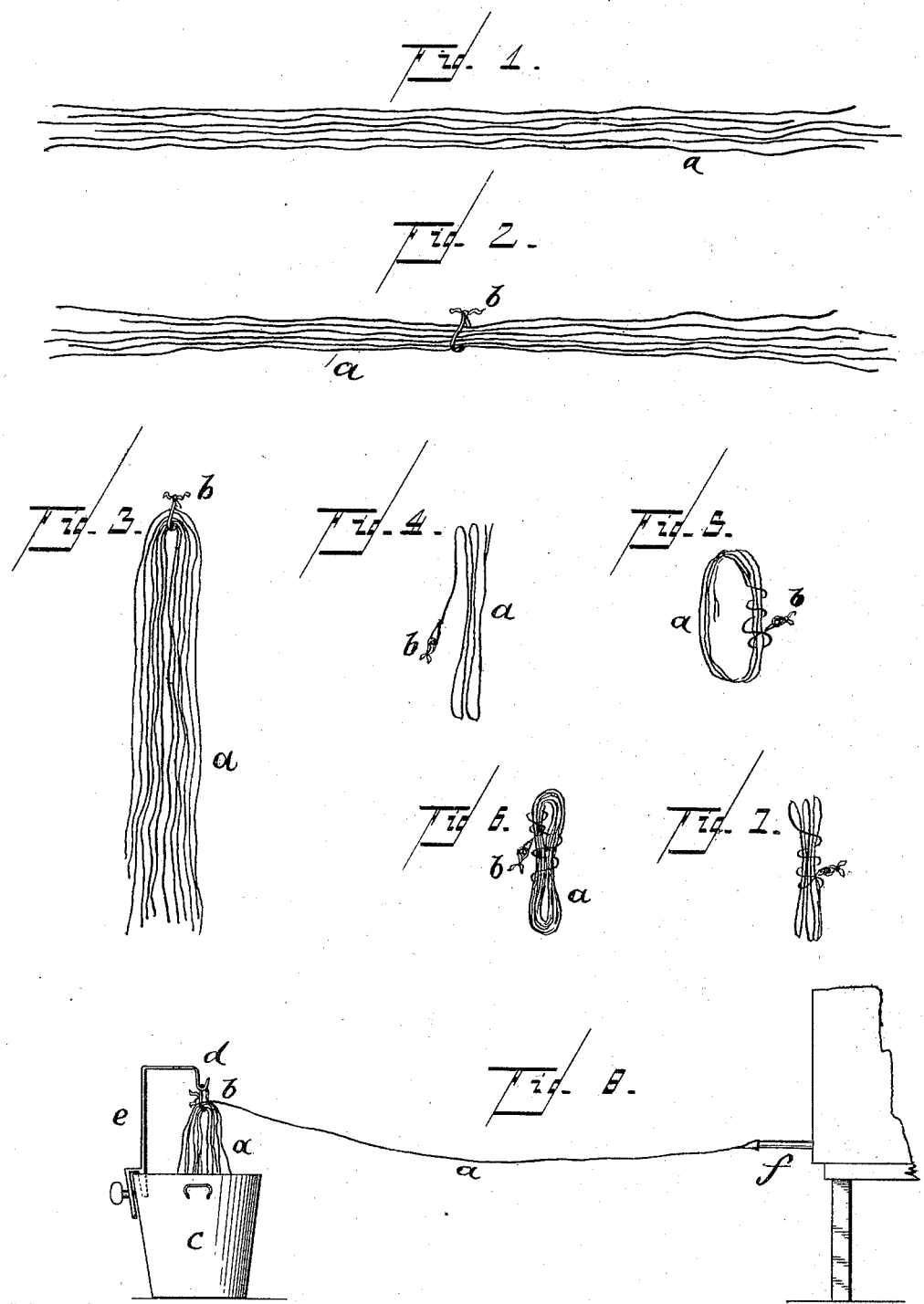

No. 625,704. Patented May 23, 1899.
C. G. SCHMIDT.
ARRANGING AND HANDLING SAUSAGE CASINGS.
(Application filed May 28, 1898.)
(No Model.) 2 Sheets—Sheet 2.
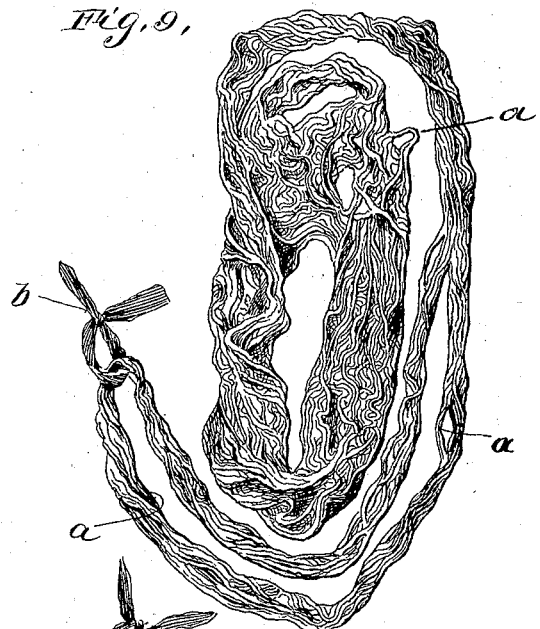
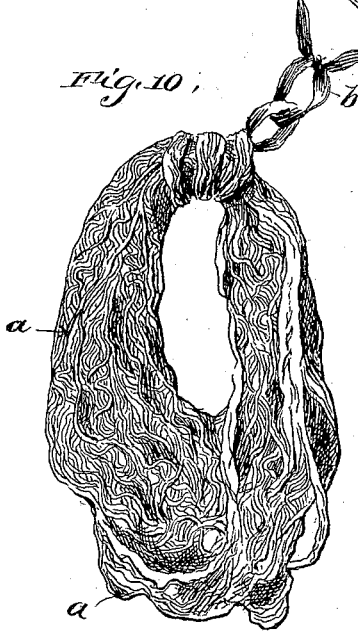
Witnesses:
A. J. Thiring
Henry Eversmann
Inventor:
Charles G. Schmidt
by C. Spengel Atty

UNITED STATES PATENT OFFICE.

CHARLES G. SCHMIDT, OF CINCINNATI, OHIO, ASSIGNOR TO THE CINCINNATI BUTCHERS SUPPLY COMPANY, OF SAME PLACE.

ARRANGING AND HANDLING SAUSAGE-CASINGS.

SPECIFICATION forming part of Letters Patent No. 625,704, dated May 23, 1899.

Application filed May 28, 1898. Serial No. 681,988. (No model.)

*To all whom it may concern:*

Be it known that I, CHARLES G. SCHMIDT, a citizen of the United States, and a resident of Cincinnati, Hamilton county, State of Ohio, have invented a new and Improved Manner of Arranging and Handling Sausage-Casings; and I do hereby declare the following to be a clear, full, and exact description of the invention, such as will enable others skilled in the art to which it appertains to make and use the same, attention being called to the accompanying drawings, with the reference-letters marked thereon, which form a part of this specification.

This invention relates to a new manner of arranging and handling sausage-casings to facilitate their manipulation during packing, shipping, and while being stuffed.

It relates particularly to such casings which consist of the entrails of sheep and are largely used by sausage-manufacturers and butchers for whom they are specially prepared, their preparation for such purpose forming the subject of an independent trade and industry. Individual casings vary in length from eighty to one hundred feet, and after having been cleaned and prepared, during which they shrivel up, they are of a width and thickness equaling about that of straw or of flattened stems of grass. Numbers of them, irrespective of length, are laid together into a bunch or skein, the length of which is reduced by repeatedly overlapping, rolling, or doubling it up, whereby they are changed into packages, bundles, or hanks of various styles after methods resembling the rolling up of twine, rope, and similar pliable objects. They remain in the shape of such packages until ready for use—that is, when required for filling—when the packages are undone and the individual casings singled out one by one and their ends traced, from one of which the filling proceeds. Before being so used they are usually soaked in water to render them soft and pliable. The handling of these casings and their manipulation are always connected with many difficulties, but particularly so at this time—that is, when made ready for filling. Before being soaked in water they are sticky and the bunches and casings do not readily separate, and in most cases such separation is not accomplished without entanglement, which is frequently of such a hopeless character that the knife is required to straighten matters out, whereby many of the casings are rendered useless. This separation and finding of the ends is further complicated by the fact that the casings are of unequal length, so that after one end is once found in a certain place it serves by no means as an indication that the others may be found near by. All recited difficulties are enhanced by reason of the even color of the casings, being generally of a dull whitish shade, which obliterates all marks of individual distinction. After being soaked they become slippery and are again and still more difficult to manage.

The object of my invention is therefore to overcome these various difficulties and all of which is done by arranging the casings in a particular manner and putting them into shape of bundles and packages gotten up in a manner which prevents entangling and consequent loss, facilitates undoing of the packages, and permits the casings to be readily singled out for the purpose of finding one of their ends to permit them to be filled.

In the following specification and particularly pointed out in the claims is found a full description of my invention and its manner of use and application.

In the drawings, on Sheet 1, the single casings *a*, by reason of their great length as compared with their limited thickness, are represented by merely a line. After having been cleaned and prepared for conservation a number of them, from perhaps five to ten, as shown in Figure 1, are laid substantially parallel alongside each other into a bundle, the number of casings as to aggregate length once determined upon being usually retained for all packages, so that the latter result all of equal size. The bundles are now ready to be reduced in length into the form of packages, which may be done by repeatedly doubling or rolling them up, for which purpose a bundle is first put into the shape as shown in Fig. 3. Before such is done, however, a string, ribbon, or band *b*, readily distinguishable from the casings by reason of the character of its material or of the color thereof and with its ends tied or otherwise connected to form a closed loop, is placed around the bundle between the ends thereof, as shown in Fig. 2. In Fig. 4 such further reduction is shown when having been attained by repeatedly doubling up, and in Figs. 5, 6, and 9 by repeatedly rolling up. When the end of the doubled-up or rolled-up bundle is nearly reached, a portion near the end thereat is in each case wound and coiled around the doubled-up or rolled-up portion of the bundle, as shown in Figs. 5, 6, 7, and 10, and the extreme end, with the band, is finally secured by being slipped under one of the coils, and whereby, finally, the change from the long bundle, as shown in Figs. 2 and 3, into the shorter package, as shown in Figs. 5, 6, 7, and 10, is completed. During the rolling or folding up of the bundle the same has been accordingly manipulated, so that such end, with the band, is kept outside and rendered available to be so used for holding the bundle together by being wound around the same.

In Figs. 4, 5, 6, and 7 to prevent confusion the individual casings, instead of being shown by a number of lines, as they appear in Figs. 1, 2, and 3, are indicated as a whole by a single line merely. In Figs. 9 and 10 an illustration is given, showing as to how they appear in detail. For shipping and packing the packages so finished are twisted, as shown in Fig. 11, to reduce their bulk, and which may be safely done now, since by reason of the manner in which the package has been formed entanglement of the casings is now hardly possible. They remain now until ready for use in this condition—that is, with band $b$ always left in such a position as to be readily seen and accessible, no matter under which one of the different styles shown the package has been formed.

When the time for use of the casings has arrived, a package of them is undone by repeating substantially, only in reverse order, the different manipulations as explained for forming the package and as shown in Figs. 3, 4, 5, 6, 7, 9, 10, and 11. During this part of the handling of the casings the start is made from the end with the band around it, the presence of which, always readily noticeable by reason of its distinguishing appearance on account of its material or the color thereof, indicates at once the proper place where to take hold. From this stage on ribbon $b$ enters prominently into proceedings, and by preserving the single casings as collected in the primary bundle (shown in Fig. 2)—that is, in their original substantially parallel arrangement—serves the very important purposes of preventing their tangling up while the package is undone, shows where to find the coiled-around end which holds the package together, as shown in Fig. 10, and until the same is opened out and has assumed again a condition, as shown in Fig. 3, in which the individual casings may be singled out and their ends traced to permit their filling. For such purpose the opened-out bundle, after the salt or other preserving means which had been used are washed out, is suspended, preferably on a hook $d$, which is provided above a suitable vessel $c$ in any manner or as shown in the drawings, Fig. 8, where it forms an upright arm $e$, secured to the vessel. Ribbon $b$, quickly found by reason of its distinguishing features, serves again at this time by furnishing the means whereby the bundle is suspended on hook $d$. The casings depending from the latter occupy vessel $c$, which contains water, so that during the following manipulations the casings are softened and readily loosen from each other and are kept wet and slippery to facilitate their separation. The individual casings are now singled out at the point of their suspension—that is, where they pass through ribbon $b$—at which point each casing is picked out and separated until one of its ends is traced, after which the filling may be started from the latter. At present such filling is usually done by a sausage-stuffing machine, for which purpose the end, after found, is attached to the discharge-spout $f$ of such a machine, followed by the separated part of the casing, which is stripped onto such spout in the well-known way, the other part readily separating from the bundle and following, sliding freely through the band. Starting thus at or near the middle of the bundle—that is, between its ends—is the only safe and sure way of obtaining quickly the ends of the casings, since by reason of their unequal lengths the position of such ends is indefinite. Furthermore, suspending them in the manner shown—that is, at the point where they are singled out of the bunch—permits their separation to be accomplished without entanglement. This is, first, by reason of the weight of the casings, which hang down in equally-distributed masses from the suspending-band, and, secondly, by reason of the water in the vessel below, wherein they are submerged, whereby they are rendered wet and slippery, and which causes them to readily come apart and slip through the mass and past each other. As will be remembered, band $b$ is tied only loosely around the bundle, so that the casings are not crowded and slip through easily. At the same time, while so slipping through this band the latter serves as a means to hold back and strip from the casings any matter, slices, fibrous appendages adhering to their outside, so that they reach the stuffing-machine in perfect condition. As will be seen, this band or ribbon $b$, by reason of its distinguishing appearance by shape or color, which latter may be blue, for instance, serves, first, as a guide by showing where to start when the closely-reduced package or bundle is to be undone and opened out. Next it shows where to start to single out the individual casings from such bundle for the purpose of tracing and obtaining one of their ends. Such being best done while the bundle is suspended, it serves at once for a means to so suspend the bundle, indicating also at once the proper point of such suspension. During all that time it keeps the casings in their original substantially parallel arrangement, which permits the ready separation and withdrawal of the casings from the bundle one by one in a manner to prevent entanglement. All of this is of the utmost importance when it is considered that such casings form simply a chaotic mass of even color without any distinguishing marks. On account of these difficulties the handling of these casings as formerly practiced led invariably to entanglement, causing loss of time and material.

As practiced under my invention, the manipulation of casings is rendered more convenient, and by preventing loss of time and material is an immense stride in advance over all other known methods of handling sausage-casings.

Having described my invention, I claim as new—

1. A package of sausage-casings consisting and formed out of a bundle of single casings placed lengthwise alongside each other and the length of which bundle has been reduced by repeatedly rolling or doubling it up, the doubled-up portions being held together by coiling and winding a part of the bundle around the portion so doubled or rolled up, a ribbon placed around that portion of the bundle which is so used to hold the package together and being at the end of such portion, which end is so placed as to be on the outside of the package, thereby rendering the ribbon thereat visible and accessible, so as to indicate the point from which to start when undoing the package after which it may also serve as a means to support the opened-out bundle of casings.

2. A package of sausage-casings prepared and gotten up for ready use by first collecting and arranging the casings substantially parallel to each other to form a bundle, a ribbon placed around this bundle so formed and at a point between its ends, the bundle being then reduced in length to form a shorter package by repeatedly overlapping, rolling or doubling it up, said ribbon preserving at all times the original parallel arrangement of the casings and preventing any portion of the bundle or package from becoming entangled with another portion thereof especially while the package is being undone and straightened out, indicating also when it is so straightened out the point from which to single out the individual casings and from which to proceed to trace their ends.

3. A package containing a number of sausage-casings arranged substantially parallel to each other and consisting of two portions or parts, of which in the one the casings are repeatedly doubled or rolled up, while the other part is wound and coiled around the part first mentioned to hold it together, the end of this latter part being so placed as to be on the outside of the package and a ribbon at the end of this latter part for the purpose of indicating where to start when undoing the package.

4. The method of putting up sausage-casings in packages for shipment and convenient use when ready for stuffing, such method consisting of arranging a number of these casings lengthwise alongside each other in a bundle, providing a band or ribbon which is loosely looped around them at a point between their ends, doubling the bundle from this point so as to bring the looped band to one end of the doubled-up bundle, further reducing the length of the latter by changing it into the form of a shorter package and doing this in such a manner as to leave the end with the band in a position to render the latter always visible and readily accessible, so that it shows where to start when undoing the package serving afterward as a means to suspend the straightened-out bundle and finally also as a starting-point from whence to single out the casings for the purpose of tracing their ends.

5. The method of manipulating sausage-casings for the purpose of filling them and freeing at the same time their exterior of any fibrous appendages, slices, &c., and which method consists of suspending a bundle of them in which they are arranged lengthwise to each other within a loop whereby they are held together and from which loop the individual casings are singled out for the purpose of tracing one of their ends to start the filling after which the casings are drawn through said loop to be filled whereby and at the same time their exterior is freed from any appendages as described.

6. The method of manipulating sausage-casings for the purpose of filling them where such casings are arranged lengthwise alongside each other in the form of bundles, which method consists of suspending such a bundle in a loop above a vessel containing water in which the larger part of such casings are submerged for the purpose of soaking them so that they become soft and slippery, next singling the individual casings out within the suspending-loop and tracing one of their ends therefrom, after which the whole casing is drawn through the suspending-loop, the casings readily separating from each other without causing entanglement, on account of their wet and slippery condition.

7. A package containing a number of sausage-casings arranged substantially parallel to each other and consisting as to the manner of its formation of two parts or portions, of which in the one the casings are repeatedly folded or rolled up, while the other part is repeatedly wound and coiled around the part first mentioned to hold the same together, the extreme end of this latter part being secured by being slipped under one of the coils formed by it and left projecting therefrom and a distinguishing-mark of an appearance contrasting from the appearance of the casings secured at such projecting end for the purpose described.

In testimony whereof I hereunto affix my signature in presence of two witnesses.

CHARLES G. SCHMIDT.

Witnesses:
ARTHUR KLINE,
C. SPENGEL.